United States Patent
Yoneda et al.

(10) Patent No.: US 6,564,337 B1
(45) Date of Patent: May 13, 2003

(54) COMMUNICATION CONTROL METHOD IN NETWORK

(75) Inventors: Noboru Yoneda, Kawasaki (JP); Kouhei Yachi, Kanazawa (JP); Mikio Okuwa, Kanazawa (JP); Yoshihiro Miyatani, Kanazawa (JP); Masako Umemoto, Kanazawa (JP); Hideki Kawamoto, Kanazawa (JP); Takayoshi Mizuma, Kanazawa (JP); Ikuo Mikami, Kanazawa (JP); Osamu Hariya, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/538,738

(22) Filed: Mar. 30, 2000

(30) Foreign Application Priority Data

Sep. 30, 1999 (JP) .......................... 11-280359

(51) Int. Cl.[7] .............................. H02H 3/05
(52) U.S. Cl. .......................... 714/4; 714/56
(58) Field of Search .............. 714/4, 43, 56; 709/239

(56) References Cited

U.S. PATENT DOCUMENTS

| | | | | |
|---|---|---|---|---|
| 5,436,909 A | * | 7/1995 | Dev et al. ...................... | 714/4 |
| 5,675,741 A | * | 10/1997 | Aggarwal et al. .......... | 709/242 |
| 5,935,215 A | * | 8/1999 | Bell et al. .................... | 709/239 |
| 6,108,300 A | * | 8/2000 | Coile et al. ................. | 370/217 |
| 6,148,411 A | * | 11/2000 | Ichinohe et al. .............. | 714/4 |
| 6,199,172 B1 | * | 3/2001 | Dube et al. ..................... | 714/4 |
| 6,446,222 B1 | * | 9/2002 | Phaal .......................... | 714/43 |

FOREIGN PATENT DOCUMENTS

| | | |
|---|---|---|
| JP | 5-56050 | 3/1993 |
| JP | 10-28130 | 1/1998 |
| JP | 11-53143 | 2/1999 |

* cited by examiner

Primary Examiner—Scott Baderman
Assistant Examiner—Joshua Lohn
(74) Attorney, Agent, or Firm—Staas & Halsey LLP (57) ABSTRACT

When communication utilizing a first protocol that is normally employed in a network wherein communication can be performed by a plurality of protocols fails, the cause of failure is examined by communication using a second protocol, and communication is recommenced utilizing the first protocol by automatically performing repair. Consequently, communication using the first protocol can be recommenced without interruption of communication, without requiring a correction operation by manual action by the operator.

19 Claims, 8 Drawing Sheets

COMMUNICATION CONTROL METHOD IN NETWORK

BACKGROUND OF THE INVENTION

1. Field of the Invention

The present invention relates to a method of controlling communication between a plurality of devices such as personal computers or printers connected to a network, and, in particular, relates to a method of communication control in a network wherein communication is possible under a plurality of protocols.

2. Description of the Related Art

Currently, LAN (Local Area Network) environments are common as a mode of effecting network connection of devices such as personal computers and/or printers. In such an LAN environment, for example TCP/IP is employed as the communication protocol between devices. Under TCP/IP, respective IP addresses are allocated to each device. Thus, when data is transmitted using TCP/IP, the IP address of the destination device (for example printer) must be designated, so it is necessary that the originating device (for example personal computer) should acquire and store beforehand the IP addresses of destination devices.

However, these IP addresses can be altered by operation by the operator. Furthermore, in an environment in which IP addresses are automatically allocated by DHCP operation, the IP addresses of the devices are not fixed. Thus, there is the problem that, when the IP address of a destination device is altered, communication with the destination device becomes impossible, since a wrong IP address is specified for the originating device as the IP address of the destination device.

In this situation, in order to recommence communication, the operator had to find the IP address of the destination device by a manual operation and correct the IP address that is stored beforehand-in the originating device; this operation was extremely troublesome.

SUMMARY OF THE INVENTION

An object of the present invention is therefore to provide a communication control method whereby, when the IP address of a destination device is altered, communication is recommenced by automatically correcting the IP address stored in the originating device.

In order to achieve the above object, according to the present invention, when communication utilizing a first protocol that is normally employed in a network wherein communication can be performed by a plurality of protocols fails, the cause of failure is examined by communication using a second protocol, and communication is recommenced utilizing the first protocol by automatically performing repair. Consequently, communication using the first protocol can be recommenced without interruption of communication, without requiring a correction operation by manual action by the operator.

Preferably, in a method of communication control in a network wherein communication is possible using a plurality of protocols, a first communication control method according to the present invention for achieving the above object comprises the steps of: commencing communication using a first protocol; examining the set condition of information for the first protocol by communication using a second protocol; if there is abnormality in the set condition, repairing this; and if there has been a failure in communication using the first protocol, after the repairing step, recommencing communication using the first protocol.

Also, in a method of communication control in a network wherein communication is possible using a plurality of protocols, a second communication control method according to the present invention for achieving the above object comprises the steps of: commencing communication using a first protocol; examining the set condition of information for the first protocol by communication using a second protocol; if there is abnormality in the set condition, repairing this; and if there has been a failure in communication using the first protocol, substituting communication utilizing a third protocol for communication using the first protocol.

In the first and second method, for example, where communication using the first protocol is communication between a first device and a second device connected to a network, in the examining step, information for the first protocol that is set in a second device is acquired by the first device, and, in the repairing step, if the acquired information and the information for the first protocol that is set in the first device do not agree, the information for the first protocol that is set in the first device is updated to the acquired information.

Also, the information for the first protocol includes, for example, address information in the first protocol of the second device. Furthermore, the first device stores beforehand the MAC address of the second device, and the address information of the second device is acquired by retrieval using the MAC address of the second device.

Furthermore, according to the present invention, there are provided a communication control device that executes the above communication control method and a recording medium that stores a program whereby the above communication control method is executed.

DESCRIPTION OF THE PREFERRED EMBODIMENTS

Embodiments of the present invention are described below. However, the technical scope of the present invention is not restricted to these embodiments.

Figure 1:
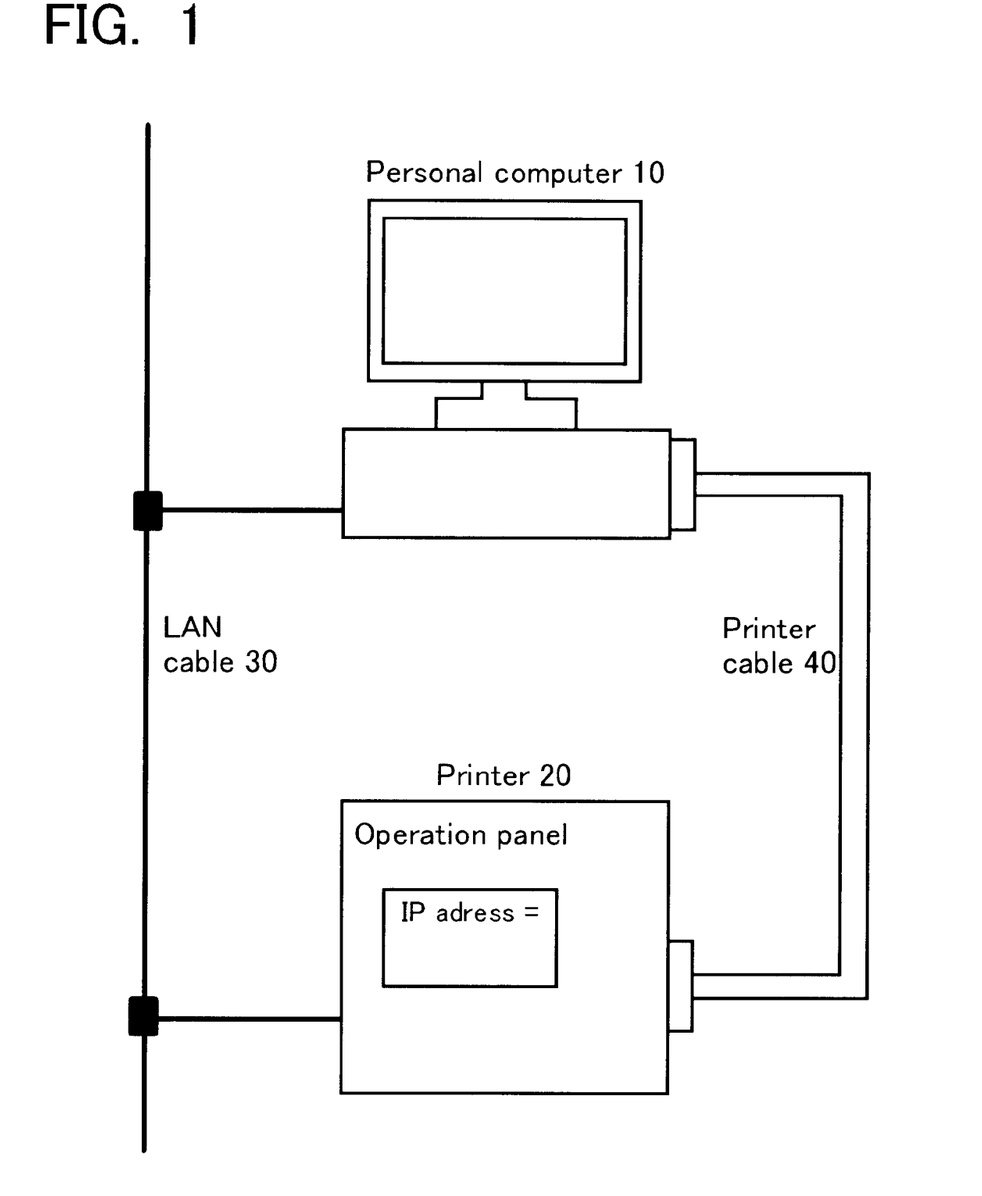
FIG. 1 is a block layout diagram of a network communication system according to an embodiment of the present invention.

FIG. 1 is a block layout diagram of a network communications system according to an embodiment of the present invention. In FIG. 1, a computer device (for example a personal computer 10) and printer 20 are connected to an LAN (Local Area Network). Printer 20 is a peripheral device of the computer device. In FIG. 1, for purposes of explanation, a single computer 10 and a single printer 20 are shown, but additional devices may be connected to the LAN. Also, devices other than personal computers or printers may be connected to the network.

Personal computer 10 and printer 20 in FIG. 1 respectively incorporate interface cards (not shown) for connection to the LAN, the interface cards being connected to an LAN cable 30. Also, personal computer 10 and printer 20 may be connected through the LAN, and may be connected by means of a printer cable 40. The interface of printer cable 40 may be for example a Centronics interface or IEEE-1284.

In an embodiment of the present invention, in a network construction as described above, a method of communication control according to the present invention will be described, taking as example the case where printing data is transmitted via an LAN from a personal computer 10 to printer 20. Also, in an embodiment of the present invention, as an example, TCP/IP is employed as the transmission protocol on the LAN. However, it should be noted that the transmission protocol need not necessarily be TCP/IP and another transmission protocol such as for example IPX/SPX could be employed.

A brief description of TCP/IP is given below.

Figure 2:
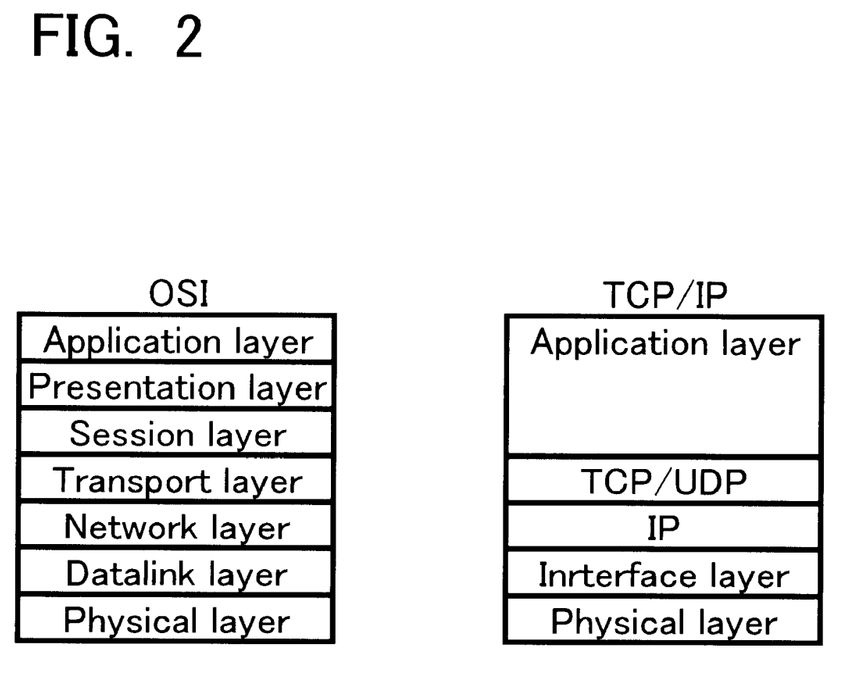
FIG. 2 is a diagram showing TCP/IP protocol layers.

FIG. 2 is a view showing the protocol layers of TCP/IP. As shown in FIG. 2, TCP/IP has a five-layer structure. Comparing with the OSI reference model, the TCP/UDP layer in the TCP/IP protocol layer corresponds to the transport layer that establishes connection between separate processes on the network, while the IP layer corresponds to the network layer whereby data is transferred. The layers above the TCP/UDP layer are application layers, while the layers below the IP layer are an interface layer and physical layer. For the lower layers, an Ethernet or FDI etc. are known.

The TCP in the TCP/UDP layer is the protocol that provides a connection-type data link, and that provides an interface of the stream type for upper-layer applications. The UDP (user datagram protocol) is a protocol that provides connection-type services. TCP has a large overhead, due to the provision of connection-type data links, while UDP provides a simple communication service for the transfer of IP datagrams themselves to applications. It should be noted that, in the description given below, communication using TCP consists in TCP/IP communication using the TCP layer in a TCP/IP protocol layer, while communication using UDP consists in TCP/IP communication using the UDP layer in the TCP/IP protocol layer.

Also, in the IP layer, two points on the network whereby data is transferred are represented by IP addresses. Consequently, layers above the IP layer request on data transfer in the IP layer by designating these IP addresses.

Figure 3:
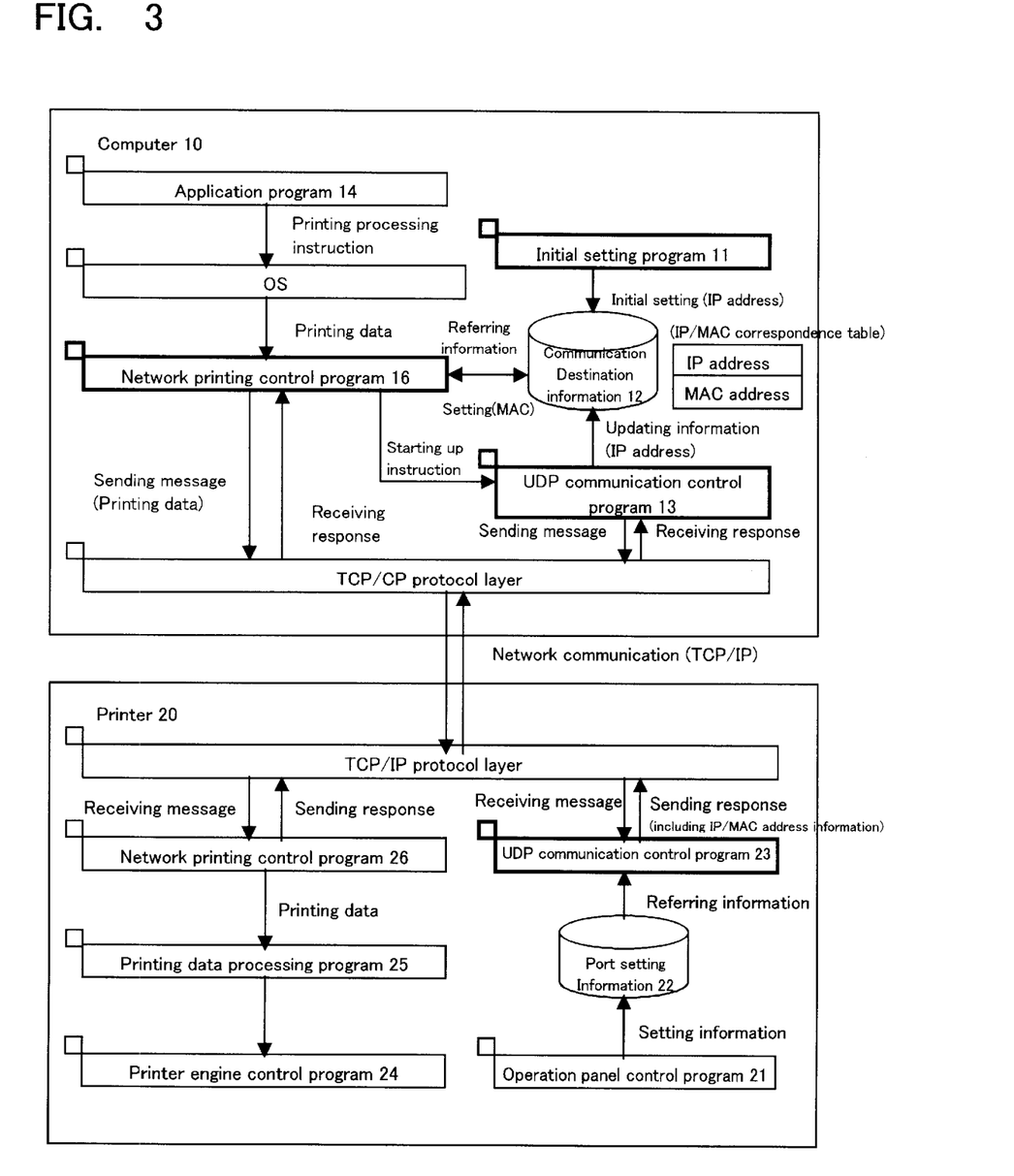
FIG. 3 is a logic layout diagram in a network communication system according to an embodiment of the present invention.

FIG. 3 is a logic layout diagram in a network communications system according to this embodiment of the invention. FIG. 4 to FIG. 9 are processing flow charts of a method of communication control according to this embodiment of the invention. Also, in personal computer 10 and/or printer 20, the necessary software (program) for executing the communication control method of the present invention is stored in a prescribed storage device. Thus, the communication control method of the present invention is executed by the communication control device (for example CPU) within the equipment running this program. Furthermore, specifically, in the case of printer 20, the necessary program is written in internal ROM, while, in the case of personal computer 10, the necessary program is installed from a recording medium. FIG. 4 to FIG. 9 are described below with reference to FIG. 3.

Figure 4:
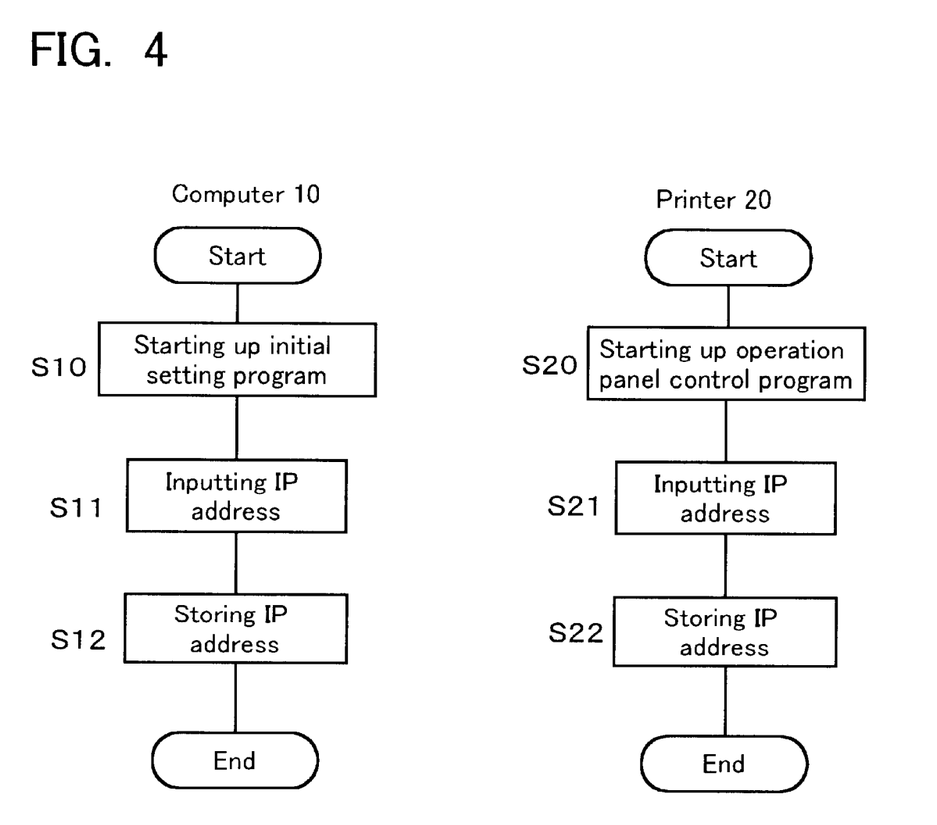
FIG. 4 is a flow chart of initial setting processing.

FIG. 4 is a flow chart of the initial setting processing. In personal computer 10, initial setting program 11 of FIG. 3 is started up (S10). The operator inputs to personal computer 10 (S11) the IP address of printer 20, which is determined beforehand. The initial setting program 11 stores the IP address that is input in IP address/MAC address correspondence table (hereinbelow referred to as IP/MAC correspondence table) of communication destination information 12 of FIG. 3 (S12).

The MAC (medium access control) address is an address peculiar to the device that is provided in the LAN interface card incorporated in the device and constitutes absolute information that cannot be altered. It should be noted that, at this stage of initial setting of processing, the MAC address is not set in the IP/MAC correspondence table.

Meanwhile, in printer 20, the operation panel control program 21 of FIG. 3 is started up (S20). The operator inputs the IP address of printer 20 that is determined beforehand by operating the operation panel (See FIG. 1)(S21). The operation panel control program 21 stores the IP address that is input thereto in port setting information 22 of FIG. 3(S22).

Figure 5:
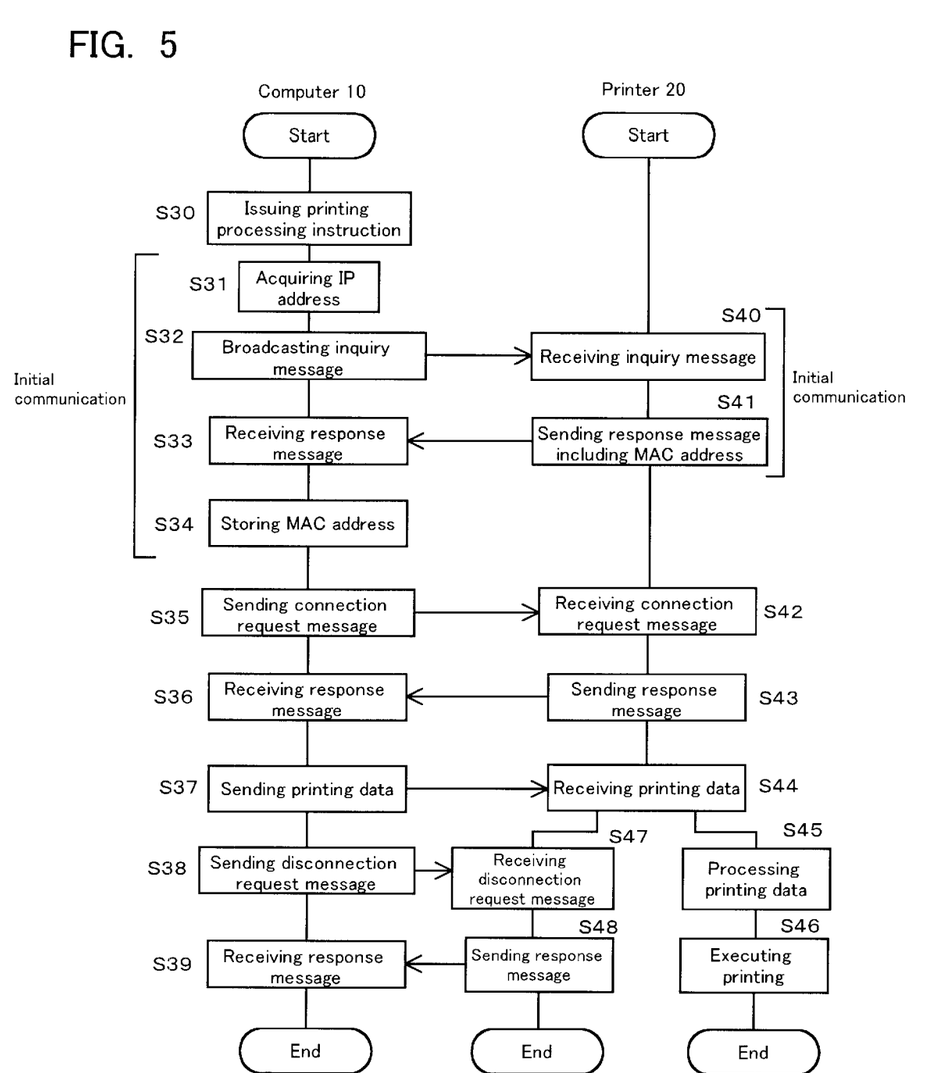
FIG. 5 is a flow chart of ordinary communication processing.

FIG. 5 is a flow chart of ordinary communication processing. In personal computer 10, application program 14 of FIG. 3 is started up, causing a printing processing instruction to be issued (S30). The printing processing instruction is sent through the OS (operating system) 15 of FIG. 3 to the network printing control program 16 of FIG. 3. The network printing control program 16 acquires the IP address of printer 20 by referring to the IP/MAC correspondence table of communication destination information 12 (S31). At this point, the MAC address corresponding to the acquired IP address is not yet set in the IP/MAC correspondence table. Accordingly, on the initial communication after completion of initialization setting, network printing control program 16 broadcasts an inquiry message using the ARP (Address Resolution Protocol) in order to acquire the MAC address corresponding to the acquired IP address (S32). This inquiry message includes the IP address information of the transmitting device i.e. the IP address and MAC address of personal computer 10 and, in addition, the IP address of the inquiry destination.

When printer 20 receives the inquiry message (S40), since the inquiry destination IP address contained therein is its own IP address, it sends to personal computer 10 (S41) a response message including the information of its own MAC address. It should be noted that, if other devices are connected to the network, these other devices also receive the data inquiry message, but, since the IP address that is the subject of inquiry and is contained in the message is not their own IP address, they do not respond to the inquiry message.

When the network printing control program 16 of personal computer 10 receives the response message from printer 20(S33), it stores the acquired MAC address, being associated with the IP address of printer 20, in the IP/MAC correspondence table (S34). Next, network printing control program 16 acquires the IP address and MAC address of printer 20 from the IP/MAC correspondence table, and sends a connection request message utilizing the TCP protocol to printer 20 through the TCP/IP protocol layer (S35).

When the network printing control program 26 of printer 20 receives the connection request message of personal computer 10 (S42), it transmits a response message to this (S43). A connection between personal computer 10 and printer 20 is thereby established, and network communication becomes possible. When the network printing control program 16 of personal computer 10 receives the response message from printer 20 (S36), it sends printing data by communication using TCP (S37). The network printing control program 26 of printer 20 receives the printing data (S44). This printing data which has been received by the printing data processing program 25 of printer 20 is then processed (S45). The printer engine control program 24 of printer 20 then drives and controls printer 20 to execute printing (S46).

When transmission of printing data has been completed, network printing control program 16 of personal computer 10 sends a disconnection request message utilizing the TCP protocol (S38). When the network printing control program 26 of printer 20 receives this disconnection request message (S47), it transmits a corresponding response message (S48). The network printing control program 16 of personal computer 10 receives this (S39). The connection between personal computer 10 and printer 20 is thereby disconnected, and communication is terminated.

Thus, in the initial communication after initialization setup has been completed, processing to acquire the MAC address of the communication destination device (S31, S32, S33, S34 and S40, S41) is necessary. But in communication processing on the second and subsequent occasions, this processing is not necessary, so it is omitted.

Figure 6:
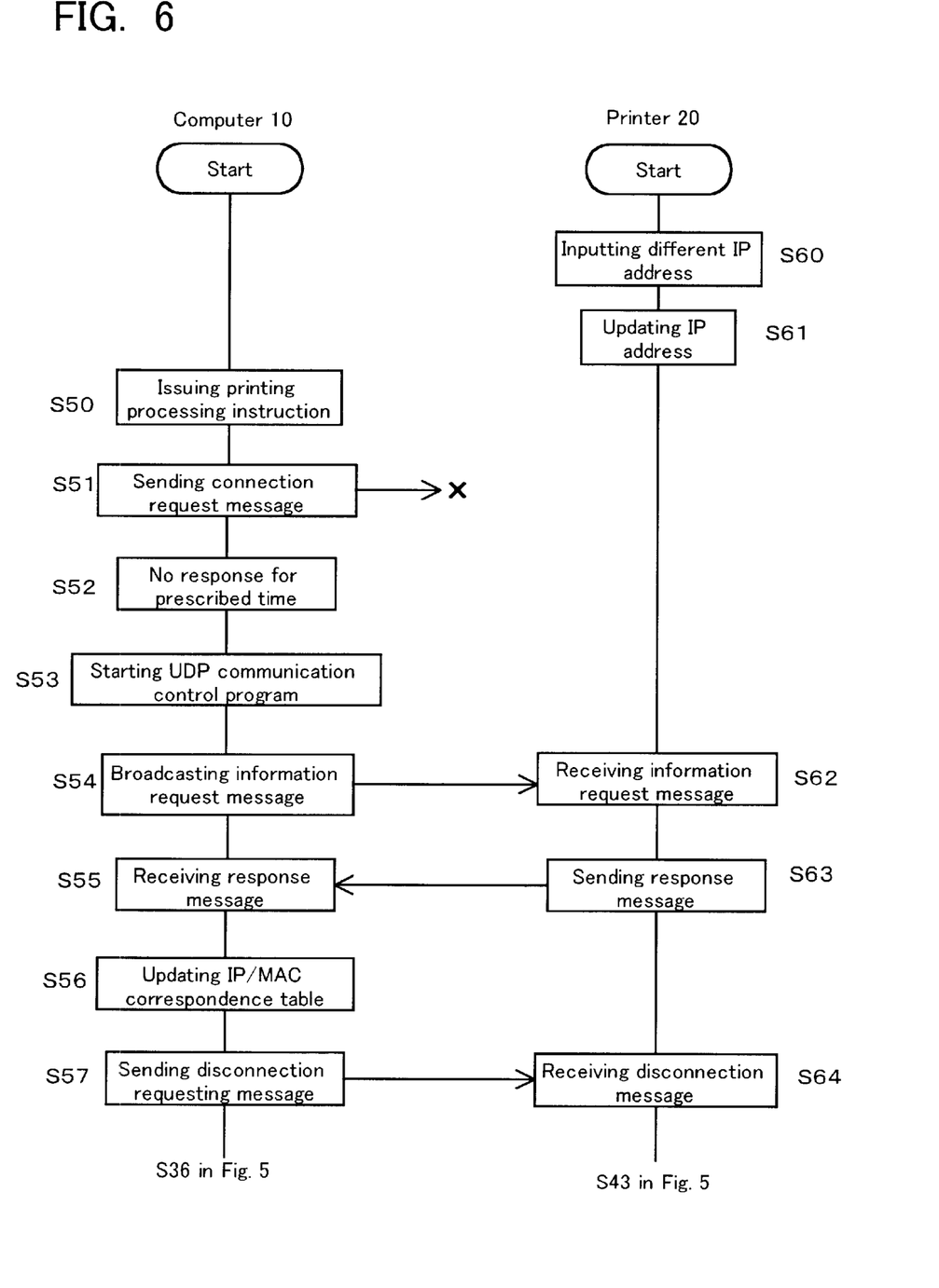
FIG. 6 is a flow chart of communication processing according to a first embodiment of the present invention.

FIG. 6 is a flow chart of communication processing in a first embodiment of the present invention. In this first embodiment, after communication utilizing the initial TCP protocol has failed, the cause of failure is examined and repaired, and processing to automatically recommence communication utilizing the TCP protocol is indicated. It should be noted that, in FIG. 6, it is assumed that processing to acquire the MAC address in FIG. 5 has already been performed (S31, S32, S33, S34 and S40, S41). Specifically, the MAC address of printer 20 has been set in the IP/MAC correspondence table of communication destination information 12 of personal computer 10.

Failure of communication utilizing TCP occurs when there is an abnormality in the setting condition of the TCP protocol, for example, if the IP address of printer 20 that is set in the communication destination information 12 of personal computer 10 and the IP address that is set in the port setting information 22 of printer 20 are different. For example, the operator inputs (S60) an IP address that is different from the initial IP address by operating the operation panel of printer 20. In response to this, the operation panel control program 21 of printer 20 updates the IP address that is stored in port setting information 22(S61).

In the same way as described above, in personal computer 10 application program 14 is started up, and a printing processing instruction is issued (S50). This printing processing instruction is sent through the OS (operating system) 15 to the network printing control program 16. Network printing control program 16 gets the IP address and MAC address of printer 20 by referencing the IP/MAC correspondence table of communication destination information 12. This IP address that is acquired is the IP address prior to the update in step S60. Network printing control program 16 transmits a connection request message through the TCP/IP protocol layer, specifying the IP address and MAC address that have been acquired, utilizing the TCP protocol (S51).

However, since the IP address of printer 20 has been updated, printer 20 does not receive the connection request message and, as a result, no response message from printer 20 is received by personal computer 10. That is, communication fails.

If the network printing control program 16 of personal computer 10 fails to receive a response message for a prescribed time (S52), it starts up the UDP communication control program 13 of FIG. 3(S53, and UDP communication control program 13 broadcasts a communication request message for acquiring the IP address, utilizing UDP communication (S54).

The inquiry message in the ARP described above was a message for inquiring of the MAC address based on the IP address that was acquired; however, the information request message utilizing UDP that is characteristic of the present invention is a message for inquiry of the IP address based on the MAC address. Whereas TCP is a connection-type communication protocol as described above, UDP is a connection-less type communication protocol that therefore makes possible broadcast transmission. Consequently, in this embodiment of the present invention, the updated IP address of printer 20 is acquired by broadcasting a communication request message to inquire of the IP address utilizing UDP.

Consequently, the information request message includes information of the IP address and the MAC address of the originating device i.e. personal computer 10 and, in addition, information of the MAC address of the inquiry destination. In response to this, personal computer 10 receives a response message including the IP address of printer 20. It would also be possible for the information request message to be a message requesting all the devices constituting the network to communicate their own IP address and MAC address. In this case, personal computer 10 receives response messages including their own IP address and MAC address from all of the devices (including printer 20) individually.

Returning to FIG. 6, the UDP communication control program 23 of printer 20 (See FIG. 3) receives an information request message from personal computer 10 (S62). By referencing port setting information 22, the UDP communication control program 23 of printer 20 sends to personal computer 10, using UDP, a response message (S63) including the IP address information that is set therein (it may also include MAC address information).

When it receives (S55) the response message from printer 20, the UDP communication control program 13 of personal computer 10 updates the IP address corresponding to the MAC address of printer 20 that is set in the IP/MAC correspondence table of communication destination information 12 to the IP address contained in the response message (S56). If MAC address information is contained in the response message, it updates the IP address that is already set in the IP/MAC correspondence table in accordance with the MAC address contained in the response message to the IP address contained in the response message. In this way, the cause of failure of communication utilizing TCP is repaired.

After updating the IP/MAC correspondence table, the network printing control program 16 of personal computer 10 gets the IP address and MAC address of printer 20 by again referencing the IP/MAC correspondence table of communication destination information 12. This IP address that is acquired is the IP address after updating in step S80. Network printing control program 16 sends a connection request message utilizing TCP through the TCP/IP protocol layer (S57) designating the IP address and MAC address that have been acquired.

Since the communication request message is transmitted designating the correct IP address and MAC address, printer 20 is able to receive this communication request message normally (S64). Subsequent processing in personal computer 10 is identical with the processing of step S36 of FIG. 5 onwards and in printer 20 is identical with the processing of step S43 onwards in FIG. 5; description thereof is therefore omitted.

Figure 7:
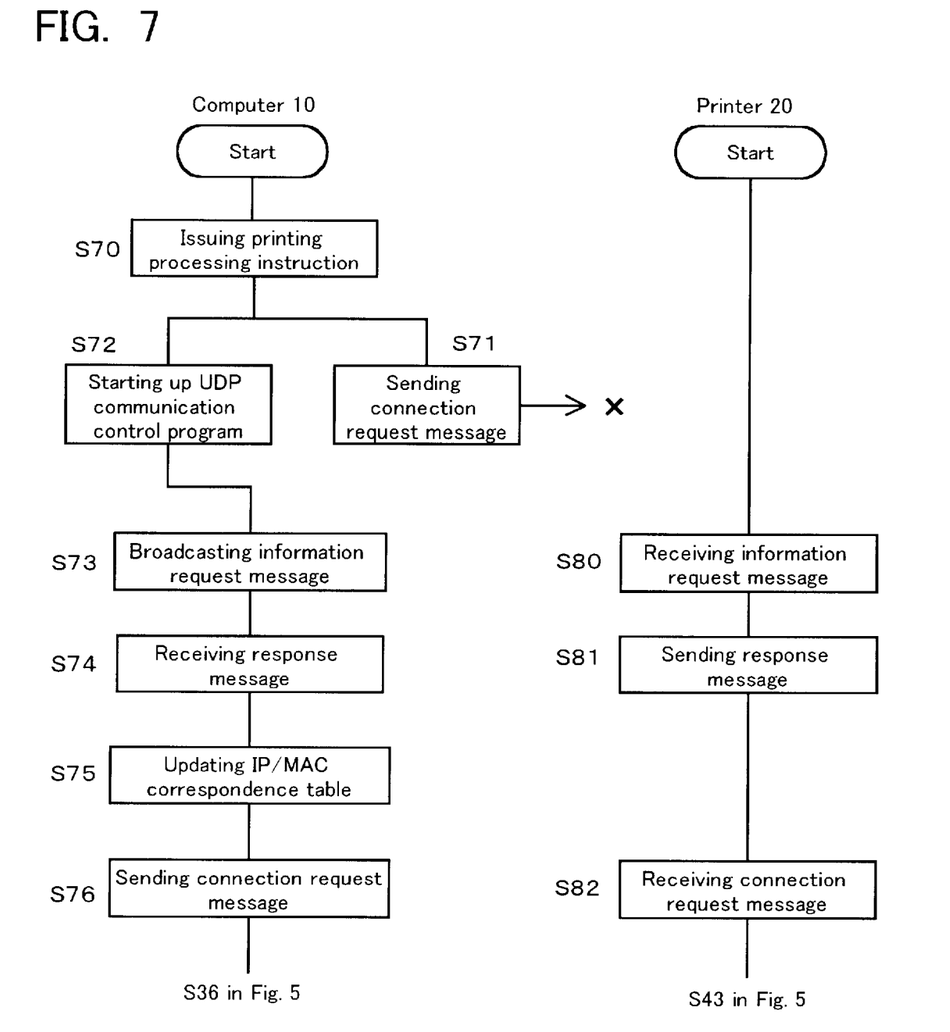
FIG. 7 is a flow chart of communication processing according to a second embodiment of the present invention.

FIG. 7 is a flow chart of communication processing according to a second embodiment of the present invention. In the communication processing of this second embodiment, unlike the communication processing of the first embodiment described above, an information request message using UDP is constantly transmitted in parallel with the transmission of the connection request message after the printing processing instruction has been issued.

Specifically, in FIG. 7, as described above, application program 14 is started up in personal computer 10 and a printing processing instruction is issued (S70). This printing processing instruction is sent to network printing control program 16 through the OS (operating system) 15. Network printing control program 16 acquires the IP address and MAC address of printer 20 by referencing the IP/MAC correspondence table of communication destination information 12. Network printing control program 16 transmits a communication request message using TCP (S71) specifying the acquired IP address and MAC address. However, since the IP address of printer 20 has been updated, this communication request message is not received by printer 20 and, as a result, no response message is received by personal computer 10 from printer 20.

In parallel with the transmission of the communication request message, network printing control program 16 starts up the UDP communication control program 13 (S72). UDP communication control program 13 broadcasts an information request message (S73) for the acquiring of the IP address, utilizing UDP. The UDP communication control program 23 of printer 20 receives the information request message from personal computer 10 (S80). By referencing the port setting information 22, the UDP communication control program 23 of printer 20 transmits to personal computer 10, utilizing UDP, a response message (S81) including the IP address information that is set therein (it may also include the MAC address information).

When the UDP communication control program 13 of personal computer 10 receives the response message from printer 20 (S74), it compares the IP address corresponding to the MAC address of printer 20 that is set in the IP/MAC correspondence table of communication destination information 12 with the IP address contained in the response message and, if these are different, updates this to the IP address contained in the response message (S75). If they are the same, it does nothing.

Next, the network printing control program 16 of personal computer 10, by referencing the IP/MAC correspondence table of communication destination information 12, acquires the IP address and MAC address of printer 20. This acquired IP address will always agree with the IP address of printer 20. Network printing control program 16 sends a connection request message utilizing TCP (S76), specifying the IP address and MAC address that have thus been acquired.

Since a communication request message designating the correct IP address and MAC address has been sent, printer 20 is able to receive the communication request message normally (S82). Subsequent processing by personal computer 10 is identical with the processing of step S36 onwards of FIG. 5 and in printer 20 with the processing of step S43 onwards of FIG. 5; description thereof is therefore omitted.

Figure 8:
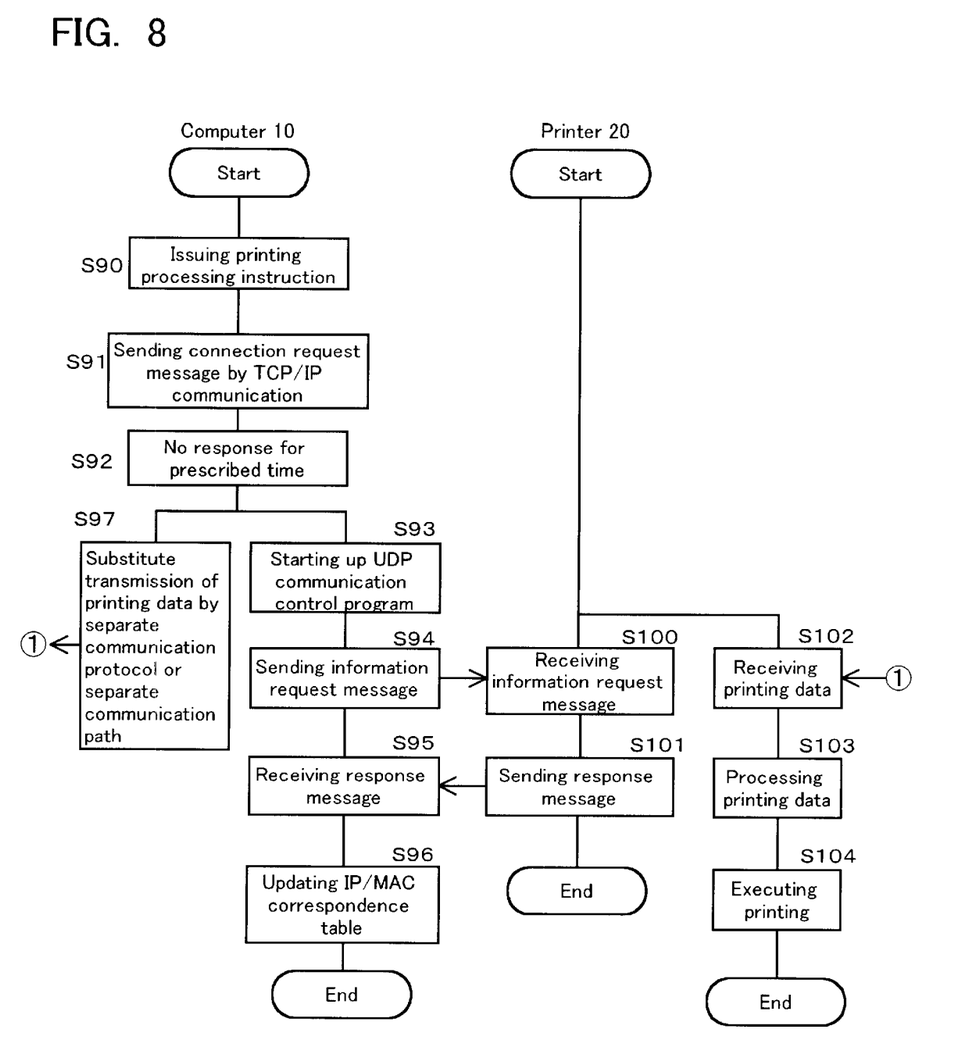
FIG. 8 is a flow chart of communication processing according to a third embodiment of the present invention.

FIG. 8 is a flow chart of communication processing according to a third embodiment of the present invention. In this third embodiment, when communication utilizing TCP fails, in parallel with the examination and repair of the cause of failure of communication utilizing TCP performed by UDP as described above, printing data is transmitted using a separate communication protocol or a separate communication path. This separate communication protocol may be for example IPX/SPX, different from the TCP/IP in the communication protocol on the network (LAN). Also, this separate communication path may be for example a Centronics interface or IEEE 1284 using a printer cable 40 which directly connects personal computer 10 and printer 20, rather than the LAN cable 30.

In FIG. 8, in the same way as described above, in personal computer 10, application program 14 is started up and a printing processing instruction is issued (S90). The printing processing instruction is sent to the network printing control program 16 through the OS (operating system) 15. Network printing control program 16 acquires the IP address and MAC address of printer 20 by referencing the IP/MAC correspondence table of communication destination information 12. This IP address that has been acquired is the IP address prior to updating in step S60. The network printing control program 16 sends a connection request message utilizing TCP through the TCP/IP protocol layer designating the acquired IP address and MAC address (S91).

However, if the IP address of printer 20 has been altered, printer 20 cannot receive the communication request message and, as a result, no response message from printer 20 is received by personal computer 10.

If network printing control program 16 of personal computer 10 has not received a response message for a prescribed time (S92), the UDP communication control program 13 is started up (S93), and UDP communication control program 13, utilizing UDP, broadcasts an information request message for acquisition of the IP address (S94).

Furthermore, in parallel with the start-up of UDP communication control program 13, network printing control program 16 makes a substitute transmission of printing data (S97) utilizing the separate communication protocol (for example IPX/SPX) or separate communication path (Centronics interface using printer cable 40).

The UDP communication control program 23 of printer 20 receives the information request message from personal computer 10 (S100). By referencing port setting information 22, the UDP communication control program 23 of printer 20 sends to personal computer 10 a response message (S101) including the IP address information that is set therein (it may also include MAC address information).

When the UDP communication control program 13 of personal computer 10 receives the response message from printer 20 (S95), it updates the IP address corresponding to the MAC address of printer 20 that is set in the IP/MAC correspondence table of communication destination information 12 to the IP address contained in the response message (S96).

On the other hand, in step S97, the substitute transmission of printing data is received by printer 20 (S102). The printing data that has been received is processed by printing data processing program 25 (S103) in the same way as described above, with the result that printing is performed (S104) by the printer engine control program 24.

In this way, in the third embodiment, if communication utilizing the ordinary communication protocol (for example TCP) fails, in parallel with the checking/repair of the cause of failure utilizing a separate protocol (for example UDP), substitute communication is performed by another communication means (a further separate protocol (for example, IPX/SPX), or printer cable).

The embodiment described above may also be employed when, in normal use, communication between personal computer 10 and printer 20 is being performed using printer cable 40 and some fault in communication occurs due to printer cable 40, making communication impossible. Specifically, since personal computer 10 and printer 20 are also connected to the LAN, personal computer 10 can acquire the printer cable communication information (for example, data transmission rate and data bit length etc.) by using UDP. When the printer cable communication information is altered on the part of printer 20, personal computer 10 uses the acquired information to update the printer cable communication information that is set in communication destination information 12 of personal computer 10. By this means, communication utilizing printer cable 40 is again made possible.

As described above, with the present invention, when communication utilizing a first protocol that is normally employed in a network wherein communication can be performed by a plurality of protocols fails, the cause of failure is examined by communication using a second protocol, and communication is recommenced utilizing the first protocol by automatically performing repair. Consequently, communication using the first protocol can be recommenced without interruption of communication, without requiring a correction operation by manual action by the operator.

Also, when the transmission-originating device and transmission-destination device can communicate by communication means other than the prescribed protocol (for example, a separate protocol or a separate communication cable), communication can be performed without interruption by changing over the communication means that is capable of communication.

The range of protection of the present invention is not restricted to the above embodiment but extends to the invention as set out in the claims and equivalents thereof.

What is claimed is:

1. A method for controlling communication in a network wherein communication is possible using a plurality of protocols, comprising the steps of:
   commencing communication using a first protocol;
   examining the set condition of information for the first protocol by communication using a second protocol;
   if there is abnormality in the set condition, repairing this; and
   if there has been a failure in communication using the first protocol, after the repairing step, recommencing communication using the first protocol.

2. The method according to claim 1, wherein the communication using the first protocol is communication between a first device and a second device connected to a network, in the examining step, information for the first protocol that is set in a second device is acquired by the first device, and, in the repairing step, if the acquired information and the information for the first protocol that is set in the first device do not agree, the information for the first protocol that is set in the first device is updated to the acquired information.

3. The method according to claim 2, wherein the information for the first protocol includes address information in the first protocol of the second device.

4. The method according to claim 3, wherein the first device stores beforehand the MAC address of the second device, and acquires the address information of the second device based on retrieval using the MAC address of the second device.

5. The method according to claim 3, wherein the first protocol is a protocol including a IP layer, and the address information of the second device is an IP address.

6. The method according to claim 5, wherein the first protocol is a protocol including a TCP layer, and the second protocol is a protocol including a UDP layer.

7. The method according to claim 2, wherein the first device is a computer system and the second device is a printer.

8. A method for controlling communication in a network wherein communication is possible using a plurality of protocols, comprising the steps of:
   commencing communication using a first protocol;
   examining the set condition of information for the first protocol by communication using a second protocol;
   if there is abnormality in the set condition, repairing this; and
   if there has been a failure in communication using the first protocol, substituting communication utilizing a third protocol for communication using the first protocol.

9. A recording medium for storing a program executed by devices connected to a network wherein communication is possible using a plurality of protocols, the program comprising the steps of:
   commencing communication using a first protocol;
   examining the set condition of information for the first protocol by communication using a second protocol;
   if there is abnormality in the set condition, repairing this; and
   if there has been a failure in communication using the first protocol, after the repairing step, recommencing communication using the first protocol.

10. The recording medium according to claim 9, wherein the communication using the first protocol is communication between a first device and a second device connected to a network, in the examining step, information for the first protocol that is set in a second device is acquired by the first device, and, in the repairing step, if the acquired information and the information for the first protocol that is set in the first device do not agree, the information for the first protocol that is set in the first device is updated to the acquired information.

11. A recording medium for storing a program executed by devices connected to a network wherein communication is possible using a plurality of protocols, the program comprising the steps of:
   commencing communication using a first protocol;
   examining the set condition of information for the first protocol by communication using a second protocol;
   if there is abnormality in the set condition, repairing this; and
   if there has been a failure in communication using the first protocol, substituting communication utilizing a third protocol for communication using the first protocol.

12. A communication control device for devices connected to a network wherein communication is possible using a plurality of protocols, comprising:
   a first unit for controlling communication using a first protocol with a separate device connected to the network by using the information for the first protocol stored in a storage unit; and
   a second unit for controlling communication using a second protocol with a separate device connected to the network;

wherein the second unit requests sending the information for the first protocol of the separate device, if the received information and the information for the first protocol stored in the storage unit do not agree, the second unit updates the information for the first protocol stored in the storage unit to the received information, if the first unit has failed in communication using the first protocol, after updating the information for the first protocol by the second unit, the first unit recommences communication using the first protocol.

13. The communication control device according to claim 12, wherein the information for the first protocol includes address information in the first protocol of the separate device.

14. The communication control device according to claim 12, wherein the storage unit stores the MAC address of the separate device, and the second unit receives the information for the first protocol of the separate device from the separate device by retrieval using the MAC address of the separate device.

15. A communication control device for devices connected to a network wherein communication is possible using a plurality of protocols, comprising:

a first unit for controlling communication using a first protocol with a separate device connected to the network by using the information for the first protocol stored in a storage unit;

a second unit for controlling communication using a second protocol with a separate device connected to the network; and a third unit for controlling communication using a third protocol with a separate device connected to the network;

wherein the second unit requests sending the information for the first protocol of the separate device, if the received information and the information for the first protocol stored in the storage unit do not agree, the second unit updates the information for the first protocol stored in the storage unit to the received information, if the first unit has failed in communication using the first protocol, the third unit substitutes communication using the third protocol for communication using the first protocol.

16. A communication control method for a device connected to a network wherein communication is possible using a plurality of protocols, comprising the steps of:

commencing communication using a first protocol with a separate device connected to the network by using information for a first protocol stored in the device;

requesting for sending information for the first protocol stored in the separate device by communication using a second protocol;

if the received information and the information for the first protocol stored in the device do not agree, updating the information for the first protocol stored in the device to the received information; and if there has been a failure in communication using the first protocol, after the updating, recommencing communication using the first protocol.

17. A communication control method for a device connected to a network wherein communication is possible using a plurality of protocols, comprising the steps of:

commencing communication using a first protocol with a separate device connected to the network by using information for a first protocol stored in the device;

requesting for sending information for the first protocol stored in the separate device by communication using a second protocol;

if the received information and the information for the first protocol stored in the device do not agree, updating the information for the first protocol stored in the device to the received information; and if there has been a failure in communication using the first protocol, substituting communication using a third protocol for communication using the first protocol.

18. A recording medium for storing a program executed by a device connected to a network wherein communication is possible using a plurality of protocols, the program comprising the steps of:

commencing communication using a first protocol with a separate device connected to the network by using information for a first protocol stored in the device;

requesting for sending information for the first protocol stored in the separate device by communication using a second protocol;

if the received information and the information for the first protocol stored in the device do not agree, updating the information for the first protocol stored in the device to the received information; and if there has been a failure in communication using the first protocol, after the updating, recommencing communication using the first protocol.

19. A recording medium for storing a program executed by a device connected to a network wherein communication is possible using a plurality of protocols, the program comprising the steps of:

commencing communication using a first protocol with a separate device connected to the network by using information for a first protocol stored in the device;

requesting for sending information for the first protocol stored in the separate device by communication using a second protocol;

if the received information and the information for the first protocol stored in the device do not agree, updating the information for the first protocol stored in the device to the received information; and if there has been a failure in communication using the first protocol, substituting communication using a third protocol for communication using the first protocol.

* * * * *